June 22, 1954  G. L. FLANAGAN  2,681,505
KNIFE HAVING A STORAGE CHAMBER IN THE HANDLE THEREOF
Filed Aug. 18, 1952
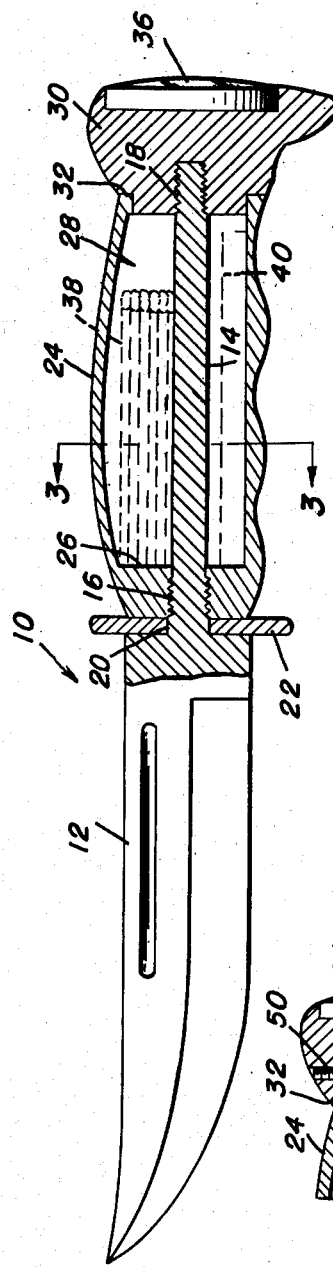
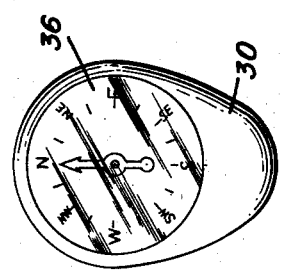
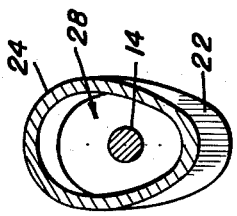
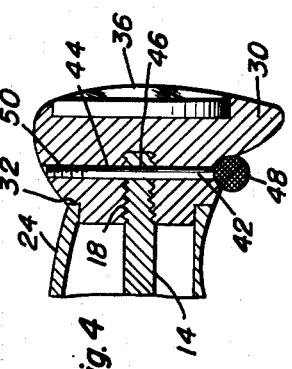
George L. Flanagan
INVENTOR.
BY
Attorneys Patented June 22, 1954

2,681,505

UNITED STATES PATENT OFFICE 2,681,505

KNIFE HAVING A STORAGE CHAMBER IN THE HANDLE THEREOF

George L. Flanagan, Hermiston, Oreg.

Application August 18, 1952, Serial No. 304,992

1 Claim. (Cl. 30—125)

This invention relates to new and useful improvements and structural refinement in knives, particularly hunting knives, and the principal object of the invention is to provide a knife having a storage chamber in the handle portion thereof to accommodate various articles such as matches, a whet stone, or the like, which a hunter, a fisherman, or any other outdoor sportsman, may use in his travels.

An important feature of the invention resides in the provision of a water-tight compartment in the handle portion of the knife to accommodate the above mentioned articles, and another feature of the invention resides in the provision of a suitable compass in the closure cap in the compartment in the handle.

Other features of the invention lie in its convenient disassembly for purposes of inspection or cleaning, while some of the advantages of the invention reside in its simplicity of construction, in its convenient and highly versatile use, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is a longitudinal sectional view of the invention;

Figure 2 is an end view thereof;

Figure 3 is a transverse sectional view, taken substantially on the plane of the line 3—3 in Figure 1, and Figure 4 is a fragmentary sectional view illustrating a modified embodiment of the invention.

Like characters of reference are employed to designate like parts in the specification and throughout the several views.

Referring now to the accompanying drawings in detail, the invention consists of a knife which is designated generally by the reference character 10 and embodies in its construction a suitable blade 12 which is formed integrally with a shank 14 having screw-threaded inner and outer end portions 16, 18 respectively. Moreover, a smooth portion 20 is provided on the shank 14 between the threaded portion 16 and the blade 12, as is clearly shown in Figure 1.

A suitable finger guard plate 22 is provided on the shank portion 20 in abutment with the blade 12, and an elongated, hollow handle 24 is provided on the shank. This handle has an open outer end and an inner end wall 26, the latter being formed with a screw-threaded bore to operatively engage the screw-threaded portion 16 of the shank, as shown.

The hollow handle 24 affords therein a storage compartment 28, and a closure cap or plug 30 is provided for the compartment, the plug or cap 30 having a screw-threaded bore to operatively engage the threaded portion 18 of the shank 14. Moreover, the cap 30 is provided with an undercut 32 to receive and abut the open end portion of the handle 24, whereby the compartment 28 is substantially water-tight.

If desired, a suitable compass 36 may be mounted in the cap 30 and the compartment 28 may be employed for accommodating matches 38, a whet stone 40, and the like.

In order to prevent the cap 30 from becoming accidentally or unintentionally loosened, a transverse locking pin 42 may extend through a bore 44 in the cap 30 and a registering bore 46 in the outer end portion of the shank 14, as illustrated in Figure 4.

The pin 42 is equipped with a finger-piece or head 48 and may be screw-threaded in the bore 44 as indicated at 50.

It is believed that the advantages and use of the invention will be readily understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In a knife, a shank having externally threaded front and rear ends and an intermediate smooth portion between said ends, a hollow handle surrounding said shank and having an open rear end and a front end provided with a threaded and reduced, axial bore receiving said front end of the shank, and a closure cap for said rear end of the handle having a reduced, axial bore receiving said rear end of the shank and also having a smooth undercut front side receiving and seating the rear end of the handle, said handle between said front end thereof and said closure cap being spaced substantially from said shank to provide an annular storage chamber in the handle.

References Cited in the file of this patent

UNITED STATES PATENTS

| Number | Name | Date |
|---|---|---|
| 1,611,886 | Champlin | Dec. 28, 1926 |
| 1,998,044 | Brown | Apr. 16, 1935 |
| 2,267,325 | Dickerman | Dec. 23, 1941 |
| 2,496,707 | Frye | Feb. 7, 1950 |